(12) United States Patent
Corrado

(10) Patent No.: US 7,197,599 B2
(45) Date of Patent: Mar. 27, 2007

(54) METHOD, SYSTEM, AND PROGRAM FOR MANAGING DATA UPDATES

(75) Inventor: Francis R. Corrado, Newton, MA (US)

(73) Assignee: Intel Corporation, Santa Clara, CA (US)

(*) Notice: Subject to any disclaimer, the term of this patent is extended or adjusted under 35 U.S.C. 154(b) by 476 days.

(21) Appl. No.: 10/747,921

(22) Filed: Dec. 29, 2003

(65) Prior Publication Data

US 2005/0144381 A1  Jun. 30, 2005

(51) Int. Cl.
G06F 13/00 (2006.01)
(52) U.S. Cl. .................. 711/114; 711/156; 711/200
(58) Field of Classification Search ................ 711/114, 711/256, 200
See application file for complete search history.

(56) References Cited

U.S. PATENT DOCUMENTS

| | | | |
|---|---|---|---|
| 5,452,444 A | | 9/1995 | Solomon et al. |
| 5,574,882 A | | 11/1996 | Menon et al. |
| 5,778,426 A | * | 7/1998 | DeKoning et al. ......... 711/122 |
| 5,911,779 A | * | 6/1999 | Stallmo et al. ............... 714/6 |
| 6,041,423 A | | 3/2000 | Tsukerman |
| 6,073,218 A | * | 6/2000 | DeKoning et al. ......... 711/150 |
| 6,334,168 B1 | * | 12/2001 | Islam et al. ................. 711/113 |
| 2001/0002480 A1 | * | 5/2001 | DeKoning et al. ......... 711/130 |

OTHER PUBLICATIONS

Intel Corporation, "Intel 80303 I/O Processor", *Datasheet*, Jun. 2002, pp. 1-56.

Patterson, D.A., G. Gibson, and R.H. Katz, "A Case for Redundant Arrays of Inexpensive Disks (RAID)", *ACM SIGMOD International Conference on Management of Data*, Jun. 1988, pp. 109-116.

PCT International Search Report and Written Opinion, May 11, 2006, for International Application No. PCT/US2004/043028.

Deyring, K. (Ed.), "Serial ATA: High-Speed Serialized AT Attachment", Rev. 1.0, Aug. 29, 2001, 36 pp.

Elliot, R.C. (Ed.), "Information Technology- Serial Attached SCSI (SAS)", Working Draft American National Standard, T10/1562-D, Revision 5, Jul. 9, 2003, Ch. 1-7, 273 pp.

Elliot, R.C. (Ed.), "Information Technology- Serial Attached SCSI (SAS)", Working Draft American National Standard, T10/1562-D, Revision 5, Jul. 9, 2003, Ch. 8-Annex K, 191 pp.

Nelson, J. (Ed.), "Fibre Channel: Framing and Signaling (FC-FS)", Rev. 1.90, Apr. 9, 2003, Ch. 1-3, 64 pp.

PCI Special Interest Group, "PCI Local Bus Specification", Revision 2.3, Mar. 29, 2002, 123 pp.

* cited by examiner

*Primary Examiner*—Reba I. Elmore
(74) *Attorney, Agent, or Firm*—William K. Konrad; Konrad Raynes & Victor LLP

(57) ABSTRACT

A method, system, and program manages updates of user data and parity data stored in stripes across a plurality of disk storage units arranged in a data organization type such as a RAID array. In one embodiment, a record of stripes potentially containing inconsistent user and parity data is stored on a disk storage unit. In another aspect, before writing a record of stripes to a disk storage unit, stripe entries for a plurality of write processes is permitted to accumulate. In another aspect, a record of stripes may be written to different disk storage units and a generation number is used to identify the latest record of stripes.

36 Claims, 9 Drawing Sheets

METHOD, SYSTEM, AND PROGRAM FOR MANAGING DATA UPDATES

BACKGROUND

1. Field

Embodiments relate to a method, system, and program for updating data in a system of organization, such as a RAID system.

2. Description of the Related Art

Various techniques have been proposed for organizing data stored in data storage devices such as disk drives. One such data storage organization is referred to as Redundant Array of Independent (or Inexpensive) Disks or (RAID). In a RAID organization, two or more disk drives are employed in combination to improve fault tolerance or performance, or both. There are different types of RAID data storage organizations and these different types are often referred to as RAID "levels 0, 1, 2 . . . .

In a RAID level 0 data organization, for example, the data of a user file is "striped", that is, blocks of user data are spread across multiple disks to improve performance. However, there is generally no redundancy provided for recovery of data should one of the drives fail in a RAID level 0 organization of data. A RAID level 3 organization of data is similar to RAID level 0 but one disk is typically reserved to store error correction data, often referred to as "parity data." This parity data may be used to reconstruct lost user data should one of the drives fail.

FIG. 1 shows an example of a RAID level 5 data organization, comprising a plurality of stripes, stripe 1, stripe 2 . . . stripe n, across an array of disk drives 20a, 20b, . . . 20e. Each stripe comprises a plurality of blocks of user data 10 and a block of parity data 12. No particular disk drive is dedicated to storing the parity data blocks 12. Instead, the blocks 12 of parity data for the stripes are distributed throughout all the disks 20a, 20b, . . . 20e of the array, to further improve performance.

FIG. 2 illustrates logical operations which may be performed to generate new parity data when updating old user data on a stripe such as stripe n in a RAID system with new data. As shown in FIG. 2, an Exclusive-OR logical function may be performed on the new user data 30 and the old user data 32 of stripe. The result of the Exclusive-OR function can be Exclusive-OR'ed with the old parity data 33 of stripe n to generate the new parity data 36 for stripe n. The new parity data 36 may be used to overwrite the old parity data 33 on the appropriate RAID storage unit and the new user data 30 may be used to overwrite the old data 32 on the appropriate RAID storage unit.

Because the user data and the parity data of any one particular stripe typically reside on different disk drives, the user data and parity data of a stripe are often not updated at the same time. New user data may be written to the stripe before the new parity data is written or vice versa. If the system were to lose power in the middle of a write operation updating a stripe, in some systems, the user data of the stripe may not be consistent with the parity data of the stripe.

Accordingly, a record may be kept of those stripes, often referred to as "dirty stripes," which may contain parity inconsistencies, in the event that the system is interrupted by a power failure or other failure before the write operations are completed. For example, some known storage controllers have a non-volatile memory such as a NVRAM (non-volatile Random Access memory) in which the dirty stripe record is maintained. Once the power is restored, the storage controller can access the dirty stripe record in the non-volatile memory and restore the parity consistency of the listed dirty stripes.

Notwithstanding, there is a continued need in the art to improve the performance of processors in data storage organization.

BRIEF DESCRIPTION OF THE DRAWINGS

Referring now to the drawings in which like reference numbers represent corresponding parts throughout:

FIG. 9 illustrates one embodiment of a flush record maintained by a journal manager in coordination with a dirty stripe record.

DETAILED DESCRIPTION OF THE ILLUSTRATED EMBODIMENTS

In the following description, reference is made to the accompanying drawings which form a part hereof and which illustrate several embodiments. It is understood that other embodiments may be utilized and structural and operational changes may be made.

Figure 1:
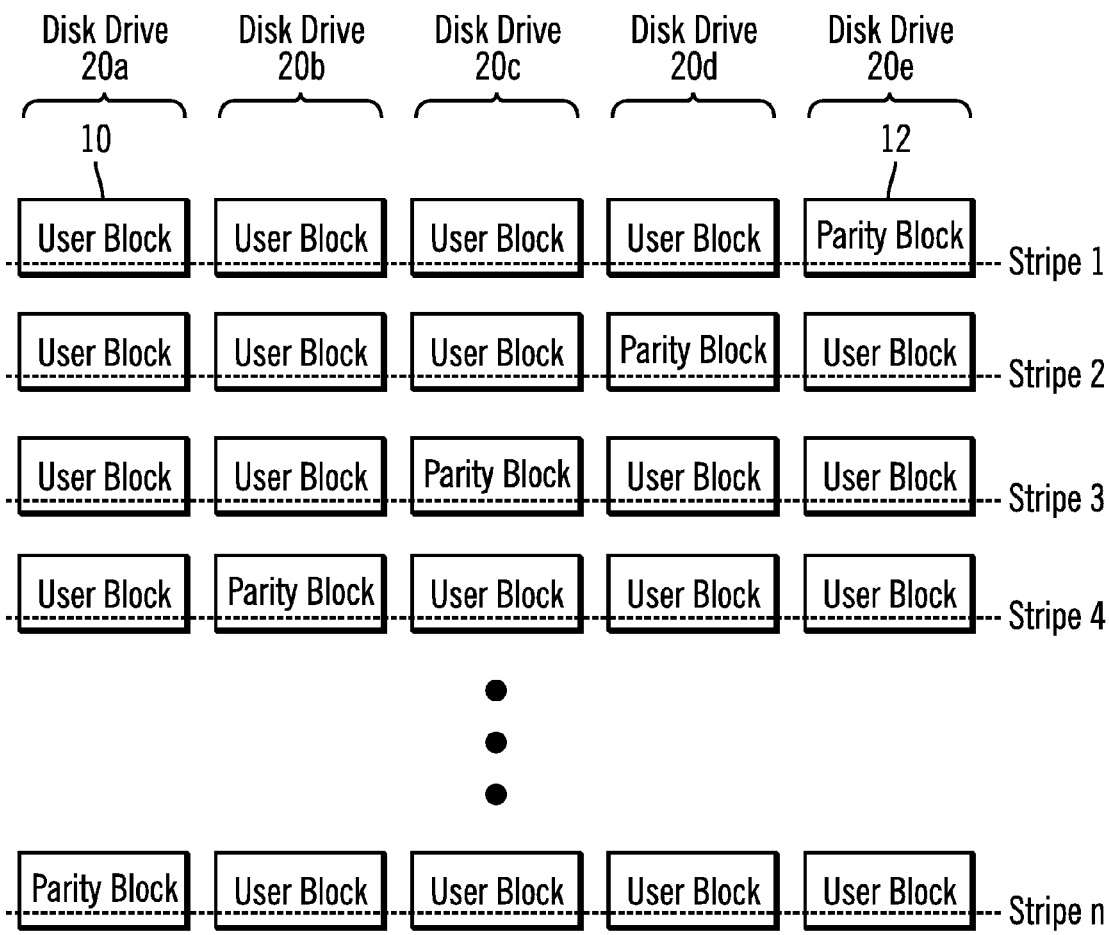
FIG. 1 illustrates a prior art organization of RAID data in stripes across a plurality of disk drives.
Figure 2:
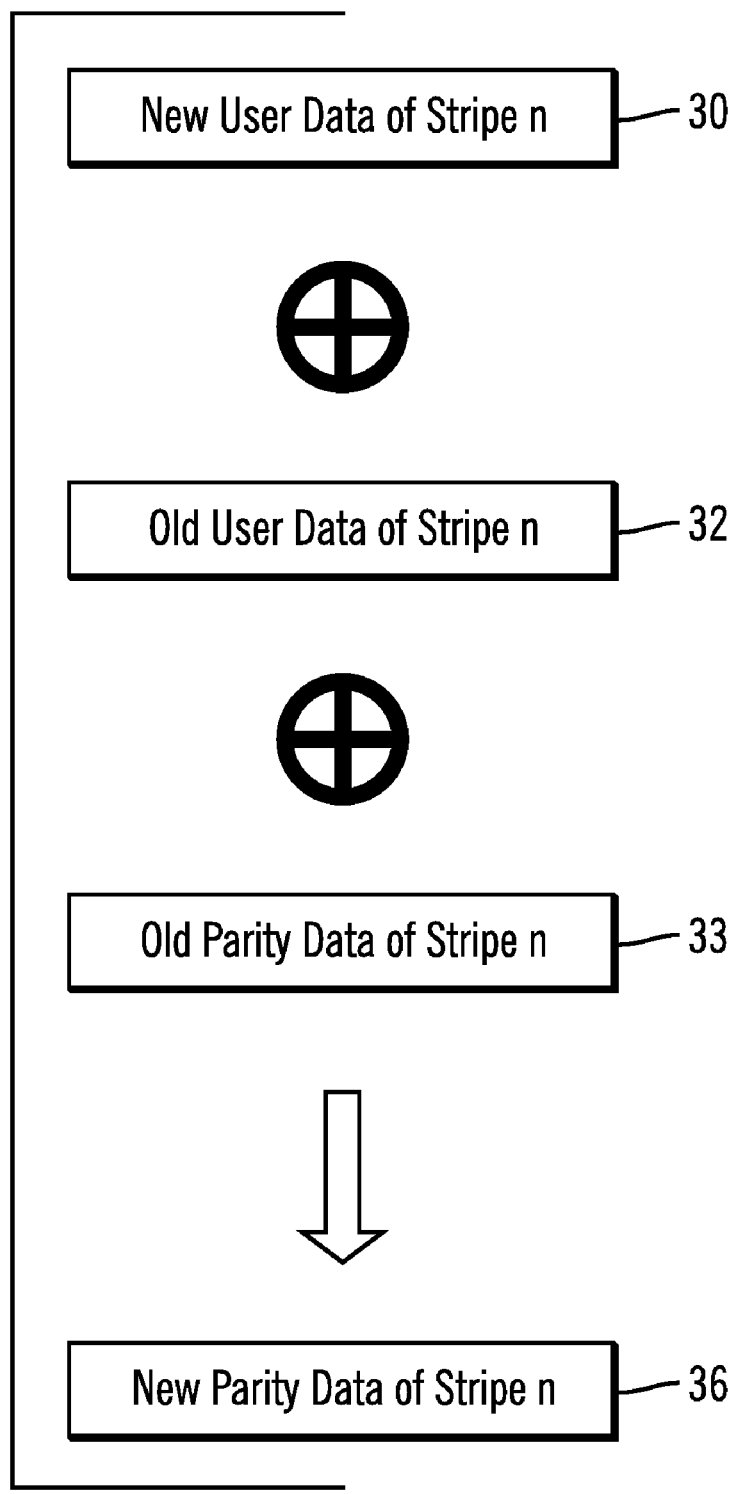
FIG. 2 illustrates a prior art generation of RAID parity data in a data update.
Figure 3:
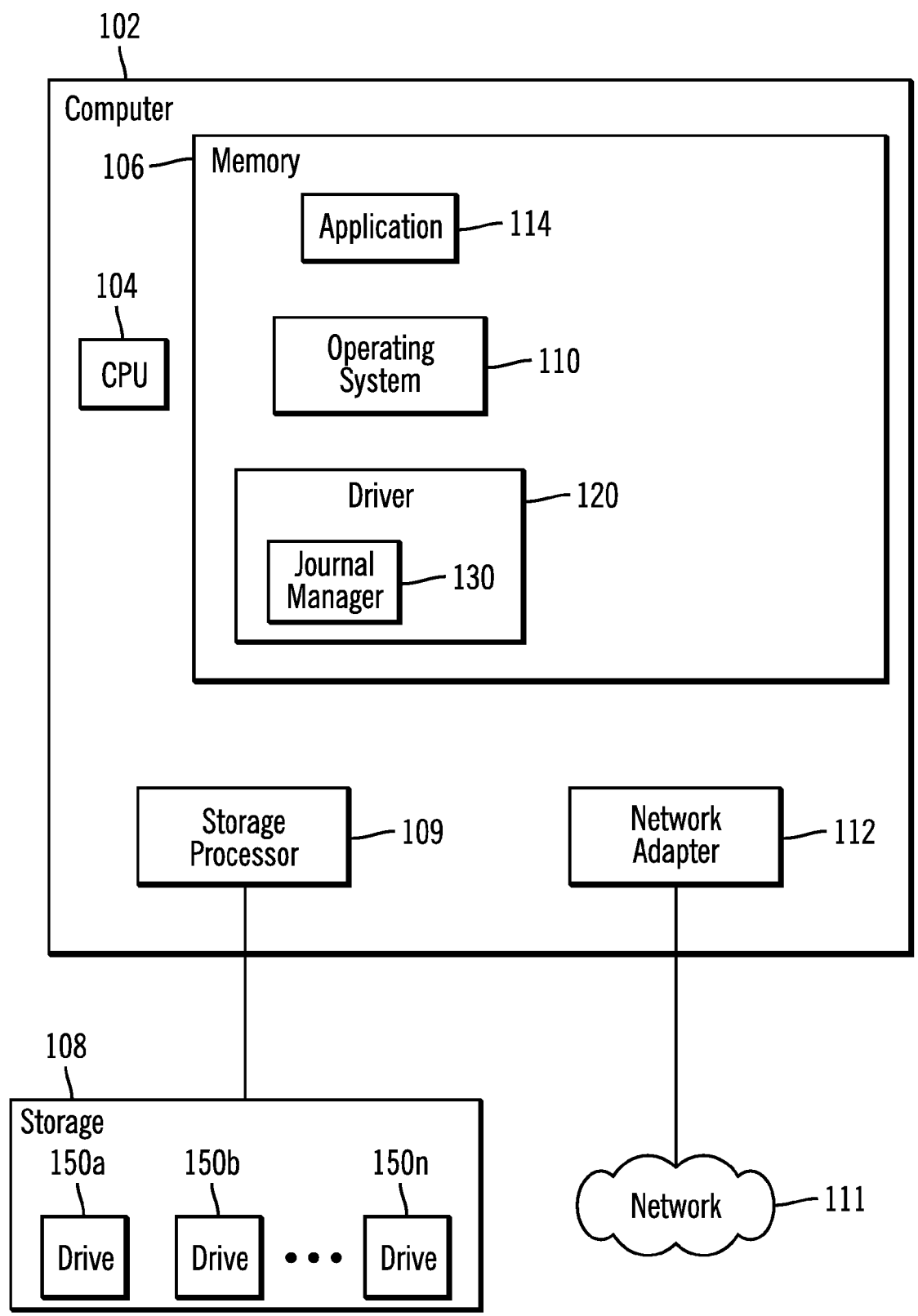
FIG. 3 illustrates one embodiment of a computing environment in which aspects are implemented.

FIG. 3 illustrates an example of a computing environment in which data updating may be implemented. A computer 102 includes one or more central processing units (CPU) 104 (only one is shown), a memory 106, non-volatile storage 108, a storage processor 109, and an operating system 110. The computer 102 may communicate with a network 111 through a network adapter 112. An application program 114 further executes in memory 106 and is capable of reading data from and writing data to the storage 108. The computer 102 may comprise any computing device known in the art, such as a mainframe, server, personal computer, workstation, laptop, handheld computer, telephony device, network appliance, virtualization device, storage controller, etc. Any CPU 104 and operating system 110 known in the art may be used. Programs and data in memory 106 may be swapped into storage 108 as part of memory management operations.

A device driver 120 executes in memory 106 and includes storage controller specific commands to communicate with the storage processor 109 and interface between the operating system 110 and the storage processor 109. The device driver 120 includes a journal manager 130 which manages the record keeping of units of data stored in the storage 108, for which the parity may be inconsistent as a result of a data update in progress. For example, the storage 108 may include a plurality of disk drives 150a, 150b . . . 150n, in an organization type such as one of the RAID levels, in which parity data is maintained.

In certain implementations, the storage processor 109 performs certain functions to assist the computer 102 in reading data from or writing data to the storage 108. For example, the storage processor 109 may have software, firmware or hardware or combinations of these to translate LBA (Logical Block Addresses) addresses from the computer 102 to cylinder, head and sector specifications of the disk drives 150a, 150b . . . 150n. An example of a suitable storage processor 109 is the 80200 processor and 80312 companion integrated circuits marketed by the Intel Corporation, the assignee of the present application. In another embodiment, a storage controller similar to the 80200 processor and 80312 companion integrated circuits may be modified to include some or all of the functionality of the journal manager 130 and write processes described herein.

Figure 4:
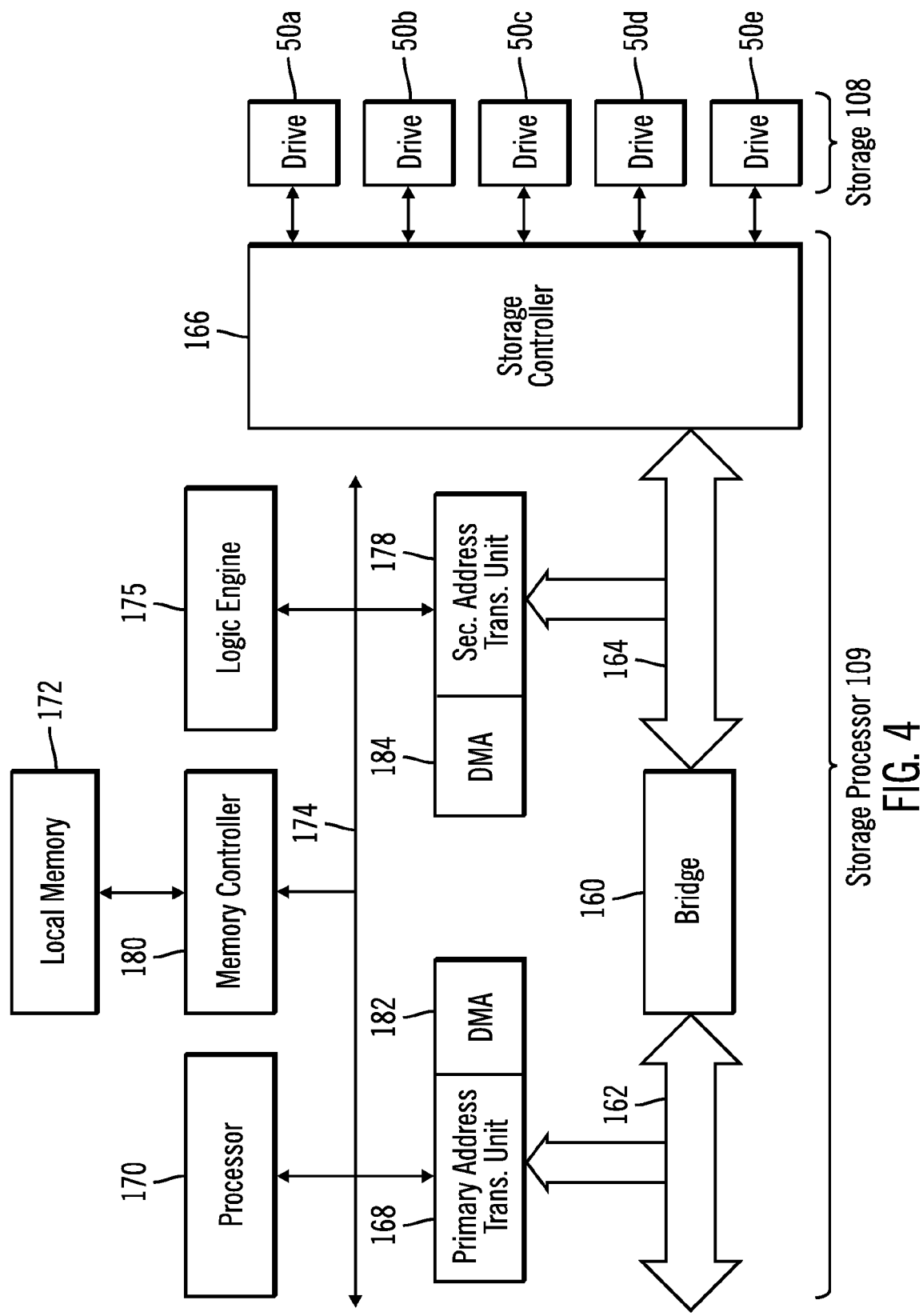
FIG. 4 illustrates an example of a storage controller which may be used in the computing environment of FIG. 3.

One example of a storage processor 109 is schematically illustrated in FIG. 4 The storage processor 109 facilitates rapid movement of large amounts of data between the host computer 102 and the storage 108. The storage processor 109 includes a bridge 160 between a primary bus 162 of the host computer 102 and a secondary bus 164 coupled to a storage controller 166 of the storage 108. The bridge 160 permits the storage controller 166 which may be a Serial-Advanced Technology Attachment (SATA) controller for example, to be physically isolated from the primary bus 162. Details on the SATA architecture are described in the technology specification "Serial ATA: High Speed Serialized AT Attachment" Rev. 1.0A (January 2003).

A primary address translation unit 168 provides a high throughput data path from the primary bus 162 to a processor 170 and a local memory 172 via a local bus 174. Also coupled to the local bus 174 is a logic engine 175 which can provide additional processing resources for the processor 170. A secondary address translation unit 178 provides a high throughput data path from the processor 170 and local memory 172 to the secondary bus 164. In the illustrated embodiment, the busses 162, 164 are PCI busses but other types of peripheral busses may be used as well. Details on the PCI architecture are provided in "PCI Local Bus, Rev. 2.3", published by the PCI-SIG.

The local memory 172 has a memory controller 180. In the illustrated embodiment, the local memory 172 is RAM type memory and is used to cache data. Other types of memory may be used as well. Direct Memory Access (DMA) controllers permit direct memory transfers from the host computer 102 to the local memory 172 and from the local memory 172 to the drives 150a . . . 150n. In addition, non-volatile memory such as non-volatile random access (NVRAM) memory may be provided to store dirty stripe information.

The functionality for performing RAID type data storage and transfers may be implemented in the storage processor 109, the driver 120 or a combination of the two. This functionality may be implemented in other devices as well such as the network adapter 112.

In accordance with one aspect of the illustrated embodiments, the journal manager 130 maintains a record 200 (FIG. 5A) of dirty stripes in a non-volatile memory such as the disk drives 150a, 150b . . . 150n. As a consequence, the need for a dirty stripe record in a non-volatile memory such as an NVRAM in the storage processor 109 can be obviated, in some applications. In other applications, the record 200 stored in one or more of the disk drives 150a, 150b . . . 150n provides a backup should the non-volatile memory or the storage controller fail.

In another aspect, the journal manager 130 maintains a dirty stripe record 202 (FIG. 5B) in a memory such as the memory 106 of the computer 102. As explained in greater detail below, such an arrangement permits the accumulation of dirty stripe record entries in the record 202 prior to writing the dirty stripe record 202 to a disk drive of the disk drives 150a, 150b . . . 150n. In this manner, the accumulated dirty stripe record 202 becomes a dirty stripe record 200 of a disk drive of the disk drives 150a, 150b . . . 150n. As a consequence, the number of disk write operations to write dirty stripe information to a disk drive of the disk drives 150a, 150b . . . 150n can be reduced, in some applications.

In yet another aspect, the journal manager 130 can generate multiple dirty stripe records 200, writing each one to a different one of the disk drives 150a, 150b . . . 150n. Such an arrangement facilitates concurrent batches of write operations to be processed. Should a need arise to utilize a dirty stripe record 200, the driver 120 can identify the most recent of the dirty stripe records 200 stored on the disk drives 150a, 150b . . . 150n. The most recent dirty stripe record 200 may then be used to identify dirty stripes (that is, stripes potentially having inconsistent user and parity data) so that the parity consistency of the identified stripes may be restored.

Figure 6:
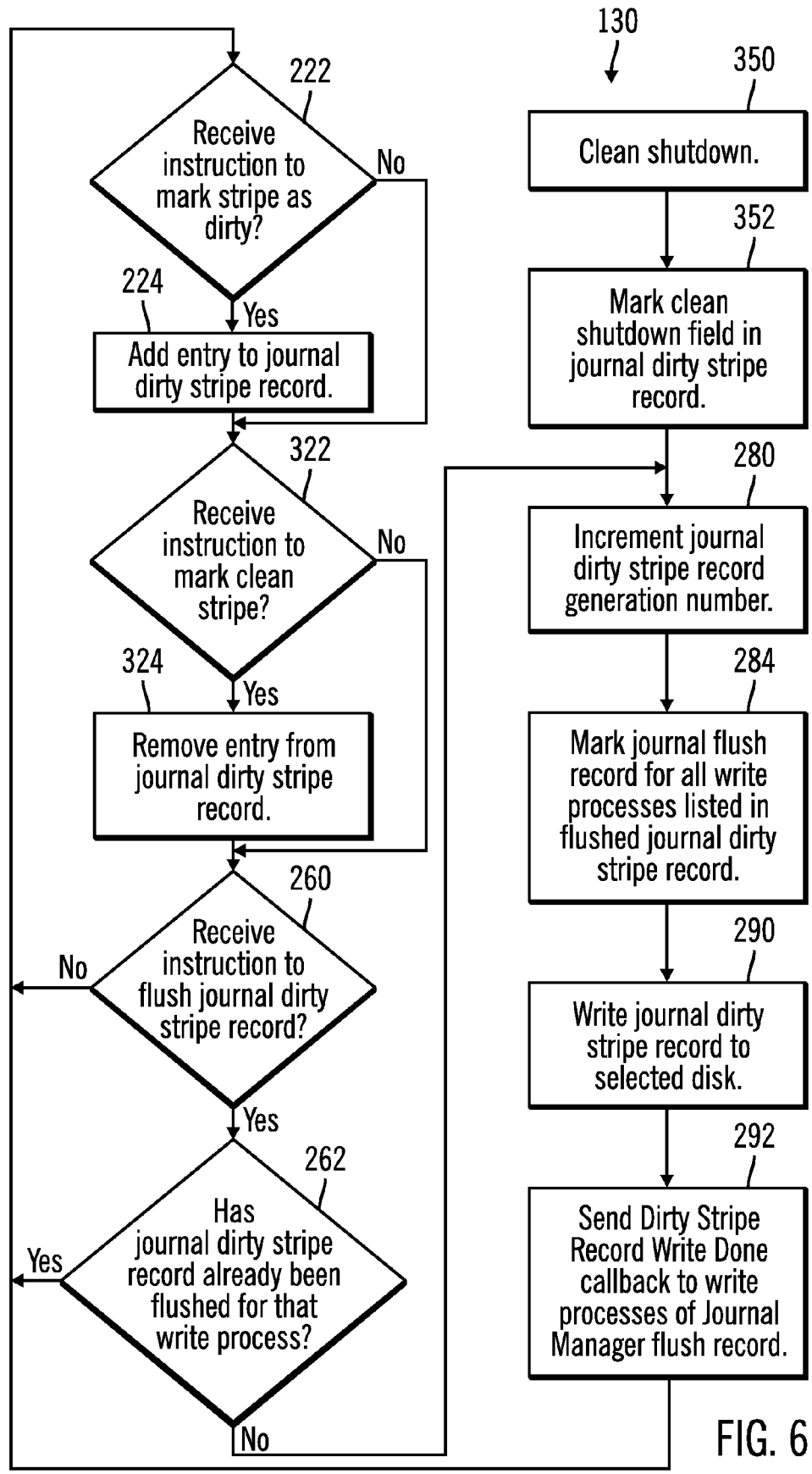
FIG. 6 illustrates one embodiment of operations performed to manage a dirty stripe record.
Figure 7:
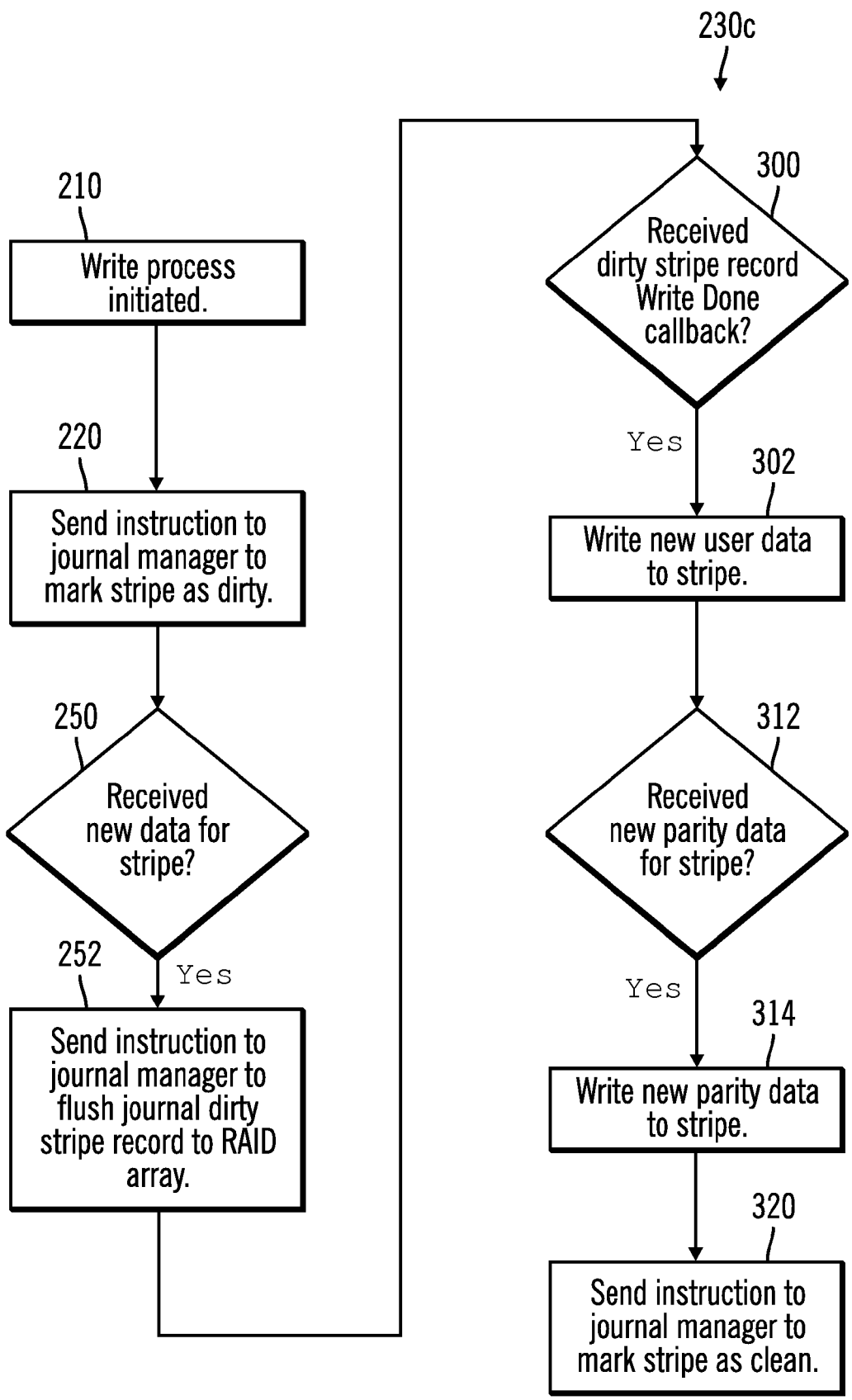
FIG. 7 illustrates one embodiment of operations performed to write data in coordination with a dirty stripe record.

FIG. 6 illustrates an example of operations of a journal manager 130 to generate and maintain disk drive dirty stripe records 200 and journal dirty stripe records 202, in coordination with one or more data write operations or processes, an example of which is shown in FIG. 7. Upon initiation (block 210, FIG. 7) of a data write process to update data in a particular stripe of a particular volume of the disk drives 150a, 150b . . . 150n arranged in a RAID array, the write process begins to read the old user data to be updated from the destination stripe of the destination volume as indicated in a read operation 212 of a timeline chart of FIG. 8.

Figure 8:
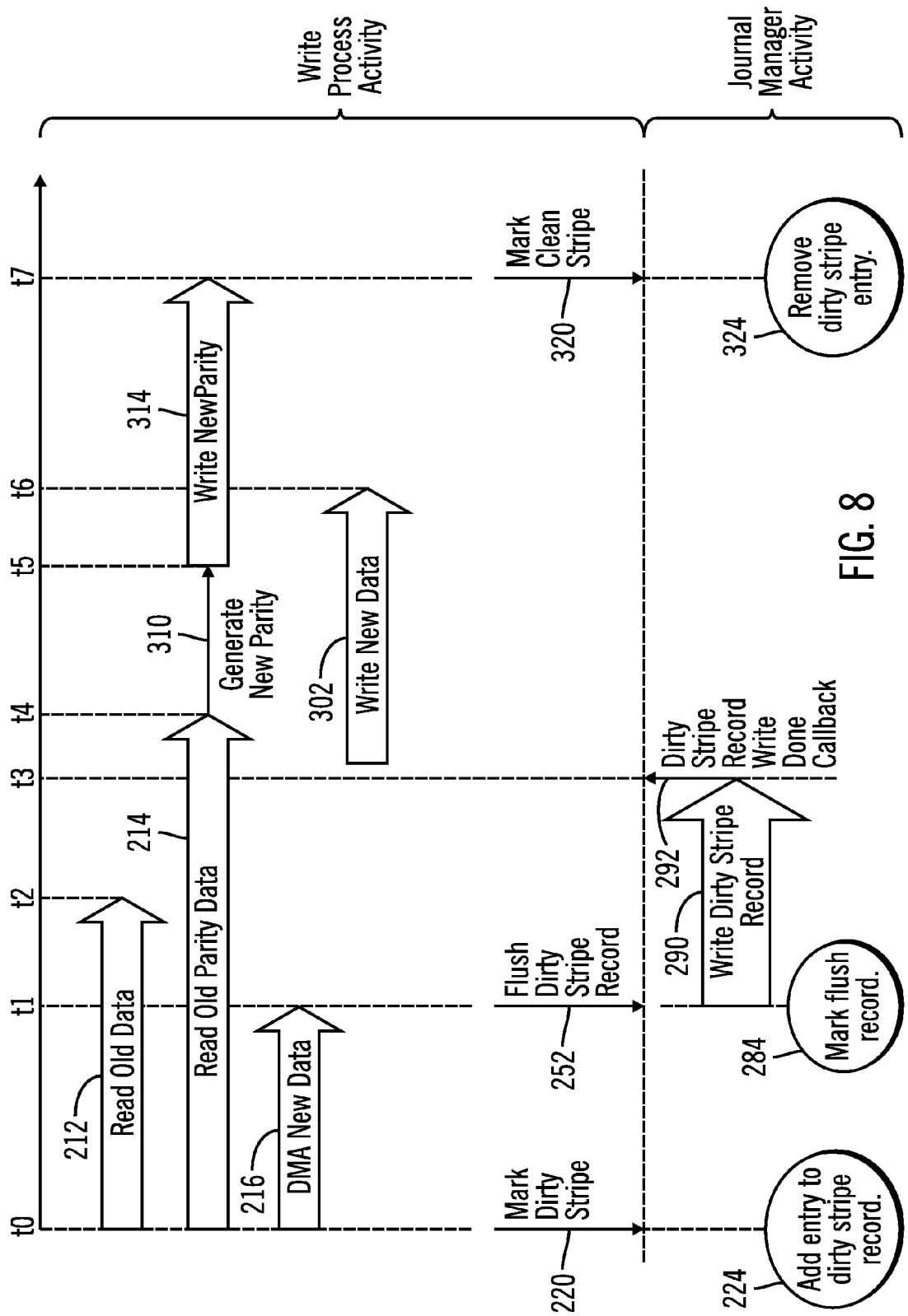
FIG. 8 illustrates a timeline chart depicting one embodiment of operations performed to manage a dirty stripe record and to write data in coordination with a dirty stripe record.

In addition, the write process begins to read the old parity data to be updated from the destination volume and stripe as indicated in another read operation 214 of FIG. 8. Still further, the write operation begins to transfer the new user data to the storage processor 109 in a transfer operation 216. In the example of FIG. 8, this transfer operation may be a DMA transfer. Other types of data transfers may be used as well. In some applications, a transfer of the new data to a storage controller prior to writing the data to the disk drives may not occur.

Figure 5:
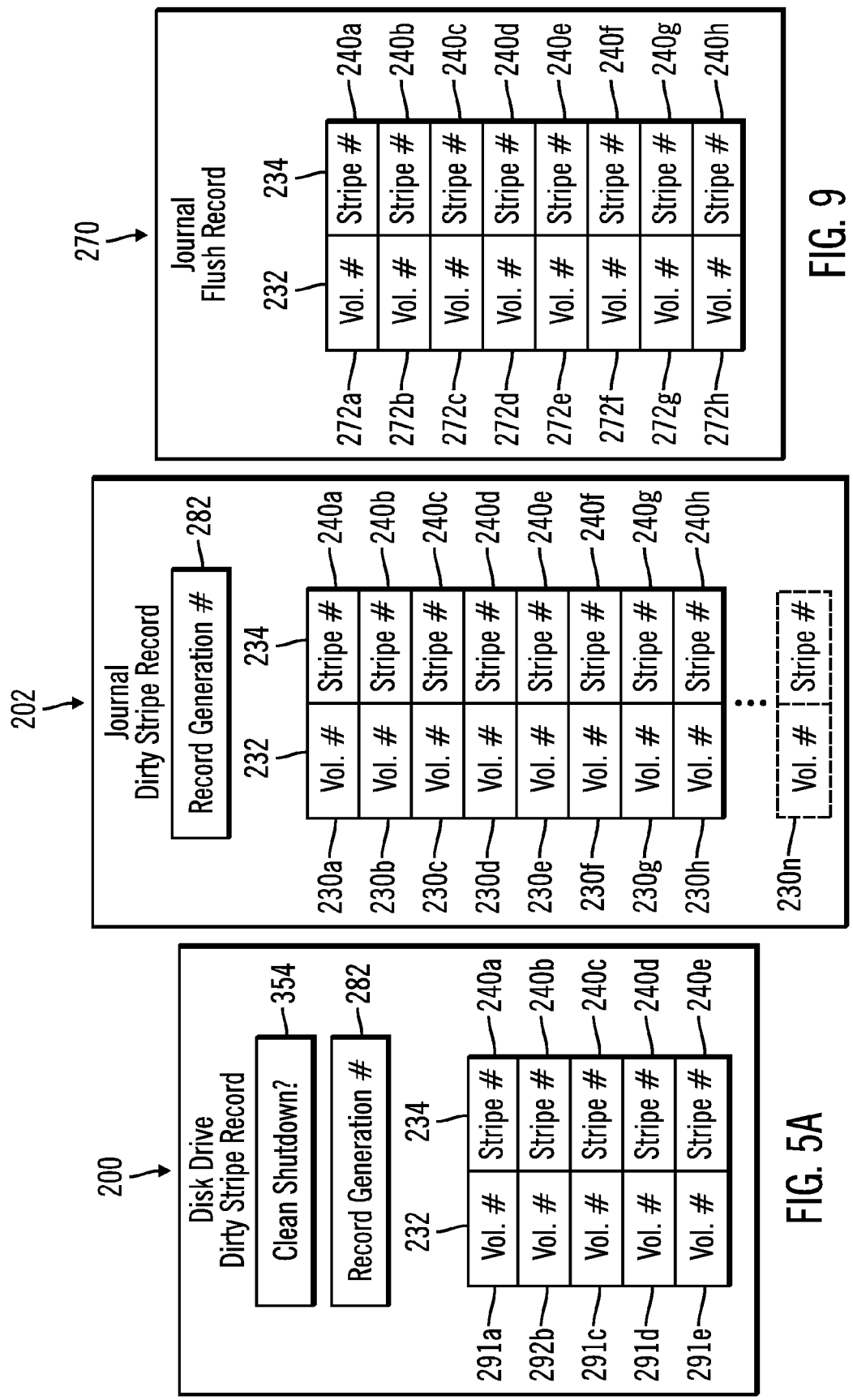
FIG. 5A illustrates one embodiment of a dirty stripe record stored on a disk drive.
FIG. 5B illustrates one embodiment of a dirty stripe record maintained by a journal manager.

Also upon initiation (block 210, FIG. 7) of the data write process, the write process issues (block 220, FIGS. 7, 8) an instruction to the journal manager 130 to mark the destination stripe of the write process as a dirty stripe in the journal dirty stripe record 202. In response (block 222, FIG. 6), the journal manager 130 records (block 224, FIGS. 6, 8) the volume number and stripe number of the destination stripe in the journal dirty stripe record 202. As shown in FIG. 5B, the journal dirty stripe record 202 includes a plurality of entries 230a, 230b . . . 230e, each of which has a field 232 to store the volume number of a destination stripe and a field 234 to store the associated stripe number of a destination stripe.

In the example of FIG. 5B, the entry 230c was written in response to a write process 240c, the operations of which are illustrated in FIG. 7. Thus, the write process 230c issued (block 220) the instruction to mark the destination stripe of that write process as a dirty stripe. In addition to the write process 230c illustrated in FIG. 7, the computer 102 may have a plurality of write processes 240a, 240b . . . 240e operating concurrently. As each write process is initiated in a manner similar to the process block 210 of FIG. 7, the write process issues an instruction to the journal manager 130 to enter the destination stripe of that write process as an entry in the journal dirty stripe record 202 in a manner similar to the process block 220 of FIG. 7.

Some dirty stripe entries may have been entered prior to the entry 230c as represented by the prior entries 230a, 230b. Thus, in this example, a write process 240a may have caused journal dirty stripe record entry 230a to be entered for the destination stripe of write process 240a; and a write process 240b may have caused journal dirty stripe record entry 230b to be entered for the destination stripe of write process 240b.

In accordance with one aspect, a dirty stripe entry need not be entered in the disk drive dirty stripe record 200 directly in response to the initiation of each write process 240a, 240b . . . . Instead, dirty stripe entries in the journal dirty stripe record 202 may be permitted to accumulate for a period of time prior to writing the journal dirty stripe record 202 as the disk drive dirty stripe record 200 in one of the disk drives 150a, 150b . . . 150n. Thus, for example, two additional concurrent write processes 240d, 240e are shown as causing the entries of two additional entries 230d, 230e, respectively, in the journal dirty stripe record 202, for the destination stripes of the write processes 240d, 240e, respectively.

In the illustrated embodiment, once one of the batch of concurrent write processes 240a, 240b . . . 240e receives (block 250, FIG. 7) the new user data to be written to the destination stripe of that write process, the write process instructs (block 252, FIGS. 7, 8) the journal manager 130 to "flush", that is, write the journal dirty stripe record 202 to one of the disk drives 150a, 150b . . . 150n so that the journal dirty stripe record 202 becomes a disk drive dirty stripe record 200 stored on one of the disk drives 150a, 150b . . . 150n. As best seen in FIG. 8, once the first write process of the batch of write processes 240a, 240b . . . 240e is initiated (block 210, FIG. 7), the time of which is marked as time t0 in the timeline of FIG. 8, the journal manager 130 can accumulate dirty stripe records in the journal dirty stripe record 202 for later write processes of the batch being initiated until one of the then concurrent write processes of the batch receives its new user data, the time of which is marked as time t1 in the timeline of FIG. 8.

It is appreciated that the time t0 marking the initiation of a write process may be for a write process different from the concurrent write process which first receives its new user data marked at time t1. Although a dirty stripe record accumulation period has been described as a period t0–t1, it is appreciated that other time periods may be selected to mark the beginning and end of a dirty stripe accumulation period. For example, it is appreciated that events other than data transfer may be used to trigger the generation of a flush instruction to the journal manager 130. In one embodiment, for example, where write processes are being generated in a batch, the write processes of the batch could inhibit the generation of a flush instruction to the journal manager 130 until a dirty stripe record has been written for each destination stripe of each write process of the batch.

Other events may be used to denote time periods for dirty stripe record accumulation. In addition to accumulating dirty stripe records, as explained below, the journal manager 130 can also mark destination stripes as clean (block 324) in response to mark clean instructions received (block 322) from various write processes during this accumulation period.

In response (block 260, FIG. 6) to an instruction from a write process to flush or write the dirty stripe information contained in a journal dirty stripe record 202 to one of the disk drives 150a, 150b . . . 150n, the journal manager 130 determines (block 262) whether the journal dirty stripe record 202 has already been flushed for the dirty stripe entry of the record 202 for the write process issuing the flush instruction. This determination is made by examining a journal flush record 270 which, like the journal dirty stripe record 202, includes a plurality of entries 272a. 272b . . . 272e, each of which has a field 232 to store the volume number of a destination stripe and a field 234 to store the associated stripe number of a destination stripe of a write process. Each entry 272a. 272b . . . 272e identifies the destination stripe of a write process for which the corresponding journal dirty stripe record entry of the entries 232a . . . 232h has already been flushed, that is, written to a disk drive dirty stripe record 200. Thus, if it is determined (block 262) that the journal dirty stripe record 202 has already been flushed for the destination stripe of the write process issuing the flush instruction, the journal manager 130 continues to accumulate (blocks 222, 224) dirty stripe entries in the journal dirty stripe record 202 for other concurrent write processes until another flush instruction is received (block 260) from a concurrent write process.

If it is determined (block 262) that the journal dirty stripe record 202 has not been flushed for the destination stripe of the write process issuing the flush instruction, the journal manager 130 increments (block 280) the record generation number stored in a field 282 of the journal dirty stripe record 202. This record generation number may be used to determine whether the information of the record 202 once written to one of the disk drives 150a, 150b . . . 150n is the most current record 200 of the written disk drive dirty stripe records 200.

In addition, the journal manager 130 marks (block 284, FIGS. 6, 8) the journal flush record 270 to indicate a list of the dirty stripes being written to the disk drive dirty stripe record 200. In one embodiment, this may be accomplished by erasing any prior entries 272a . . . 272e of the journal flush record 270 and copying all of the current dirty stripe entries 232a . . . 232e of the journal dirty stripe record 202 to the journal flush record 270. In this manner, the journal flush record 270 can provide a record of all the dirty stripe entries 232a . . . 232e written to the latest disk drive dirty stripe record 200.

Still further, the journal manager 130 writes (block 290, FIGS. 6, 8) the information of the current journal dirty stripe record 202 to one of the disk drives 150a, 150b . . . 150n (such that the current journal dirty stripe record 202 becomes the latest disk drive dirty stripe record 200.) Thus, in this example, the dirty stripe entries 230a–230e of the record 202 are written as the dirty stripe entries 291a–291e of the disk drive dirty stripe journal 200. In addition, the generation number field 282 of the record 202 is copied to the field 282 of the record 200.

Upon completion of the writing of the latest disk drive dirty stripe record 200, the journal manager 130 sends (block 292, (block 290, FIGS. 6, 8) a dirty stripe record write done callback to each of the write processes identified by the destination stripes entries 272a . . . 272e of the journal flush record 270. This callback indicates to the write processes listed in the journal flush record 270 that the record identifying their destination stripes as dirty stripes has been written to the disk drives as the latest disk drive dirty stripe record 200.

Hence, the write processes receiving (block 300, FIG. 7) the dirty stripe record write done callback, may begin to write (block 302, FIGS. 7, 8) the new user data of each write process to the destination stripe of the associated write process. Should a power failure or other disruption occur during the write process, the consistency of the parity data of the potentially dirty stripes as identified in the latest disk drive dirty stripe record 200 written to the disk drives may be restored. Thus, a reinitialization of the parity data of an entire volume can be avoided.

Once a write process has read (operation 212, FIG. 8) the old data from the destination stripe, has read (operation 214, FIG. 8) the old parity data from the destination stripe, and received (operation 216, FIG. 8) the new data to be written to the destination stripe of the write process, the write process can generate (operation 310) the new parity data. In addition to writing the new user data once the dirty stripe record write done callback is received, a write process once it completes the generation (block 312, FIG. 7) of the new parity data for the destination stripe, can begin to write (block 314, FIGS. 7, 8) the new parity data to the destination stripe of the write process.

Once a write process has completed the writing of both the new user data and the new parity data to the destination stripe of the write process, the writing of data to the destination stripe of the write process is complete. Accordingly, the write process can issue (block 320, FIGS. 7, 8) an instruction to the journal manager 130 to mark the destination stripe of the write process as clean.

In response (block 322, FIG. 6) to the mark clean instruction from a write process, the journal manager 130 removes (block 324) the entry from the journal dirty stripe record 202 which identified the destination stripe for that write process as a dirty stripe, since the write process for that stripe has been completed and the stripe is no longer potentially "dirty", that is the user data and parity data are not potentially inconsistent. However, in accordance with another aspect, the journal manager 130 may not immediately flush the information of the updated journal dirty stripe record 202 to the disk drives 150a, 150b . . . 150n. Instead, the journal manager can continue to accumulate (block 222) instructions from new concurrent write processes and add (block 224) their destination stripes to the journal dirty stripe record 202 as indicated by record 202 entries 230f, 230g, 230h . . . 230n in phantom, until a flush instruction is received (block 260) for a destination stripe entry which has not yet been flushed (block 262). Still further, the journal manager can continue to accumulate (block 322) mark stripe clean instructions from previously concurrent write processes as those write processes complete, and remove (block 324) their destination stripes from the journal dirty stripe record 202 until a flush instruction is received (block 260) for a destination stripe entry which has not yet been flushed (block 262). In this manner, write operations to the disk drives 150a, 150b . . . 150n can be reduced.

Once it is determined (block 262) that the journal dirty stripe record 202 has not been flushed for the destination stripe of a write process issuing a flush instruction, the journal manager 130 increments (block 280) the record generation number stored in the field 282 and marks (block 284, FIGS. 6, 8) the journal flush record 270 to indicate the list of the dirty stripes being written to the disk drive dirty stripe record 200. Still further, the journal manager 130 writes (block 290, FIGS. 6, 8) the current journal dirty stripe record 202 to one of the disk drives 150a, 150b . . . 150n such that the information contained in the current journal dirty stripe record 202 becomes the latest disk drive dirty stripe record 200. Should a power failure or other disruption occur subsequent to this time, the consistency of the parity data of the destination stripes cleared from the journal dirty stripe record 200 will not need to be restored since the write processes to the destination stripes of the cleared entries have each been completed. Hence, a reinitialization of the parity data of the destination stripes marked as clean can be avoided.

If the computer system 102 is being shut down (block 350, FIG. 6) in the normal fashion, such that all write processes have been completed and there are no dirty stripes remaining in the journal dirty stripe record 202, the journal manager 130 can mark (block 352) a field 354 (FIG. 4) of the journal dirty stripe record 202 to indicate that a clean shut down is taking place. Also, if the system or the journal manager 130 detects no RAID write operations for a period of time, such as 3 seconds, for example, the field 354 may be marked to indicate a clean shut down. As a result, if power is subsequently lost, a clean up operation upon reboot may be avoided.

In addition, the journal manager 130 increments (block 280) the record generation number stored in the field 282 of the journal dirty stripe record 202 and marks (block 284, FIGS. 6, 8) the journal flush record 270 to indicate that the list of the dirty stripes being written to the disk drive dirty stripe record 200 is empty. In one embodiment, this may be accomplished by erasing any prior entries 272a . . . 272e of the journal flush record 270. Still further, the journal manager 130 writes (block 290, FIGS. 6, 8) the current journal dirty stripe record 202 to one of the disk drives 150a, 150b . . . 150n (such that the current journal dirty stripe record 202 becomes the latest disk drive dirty stripe record 200.) In this embodiment, the entries of the journal dirty stripe record 202 will be empty since a clean shutdown is taking place. Upon completion of the writing of the latest disk drive dirty stripe record 200, the journal manager 130 need not send (block 292, FIGS. 6, 8) a dirty stripe record write done callback since no write processes are identified by the empty destination stripes entries 272a . . . 272e of the journal flush record 270.

Upon restarting the system 102, the clean shut down field 354 of the disk drive dirty stripe record 200 having the latest generation number as indicated by the field 282, may be examined. If the field 354 indicates that the system was previously shut down in a clean fashion, the consistency of the parity data of no stripes may need to be restored. Thus, a reinitialization of the parity data of an entire volume can be avoided. On the other hand, if the clean shutdown field 354 of the latest disk drive dirty stripe record 200 indicates that the shut down was not clean, the entries 291a, 291b . . . of the disk drive dirty stripe record 200 may be examined to identify those stripes potentially having inconsistent user and parity data such that the parity data for the identified stripes may be reinitialized.

ADDITIONAL EMBODIMENT DETAILS

The described techniques for managing data migration may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art.

In certain implementations, the device driver may be included in a computer system including a storage controller, such as a Serial-Advanced Technology Attachment (SATA) referred to above, a Serial Attached SCSI (SAS), Redundant Array of Independent Disk (RAID), etc., controller, that manages access to a non-volatile storage device, such as a magnetic tape or one or more disk storage units, each disk storage unit including a magnetic disk drive or an optical disk. In alternative implementations, the storage controller embodiments may be included in a system that does not include a driver. Further details on the SAS architecture for devices and expanders is described in the technology specification "Information Technology—Serial Attached SCSI (SAS)", reference no. ISO/IEC 14776-150: 200x and ANSI INCITS.***:200x PHY layer (Jul. 9, 2003), published by ANSI.

In certain implementations, the device driver and storage controller embodiments may be implemented in a computer system including a video controller to render information to display on a monitor coupled to the computer system including the device driver and network adapter, such as a computer system comprising a desktop, workstation, server, mainframe, laptop, handheld computer, etc. Alternatively, the storage controller and device driver embodiments may be implemented in a computing device that does not include a video controller.

In certain implementations, the journal manager 130 is shown as part of a driver operating in host memory 106. In other embodiments, the journal manager 130 may be implemented in hardware such as in a storage processor 109. Thus, the journal manager may be implemented in software, hardware, firmware or any combination thereof.

In certain implementations, the network adapter may be configured to transmit data across a cable connected to a port on the network adapter. Alternatively, the network adapter embodiments may be configured to transmit data over a wireless network or connection, such as wireless LAN, Bluetooth, etc.

The illustrated logic of FIGS. 6–7 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

Figure 10:
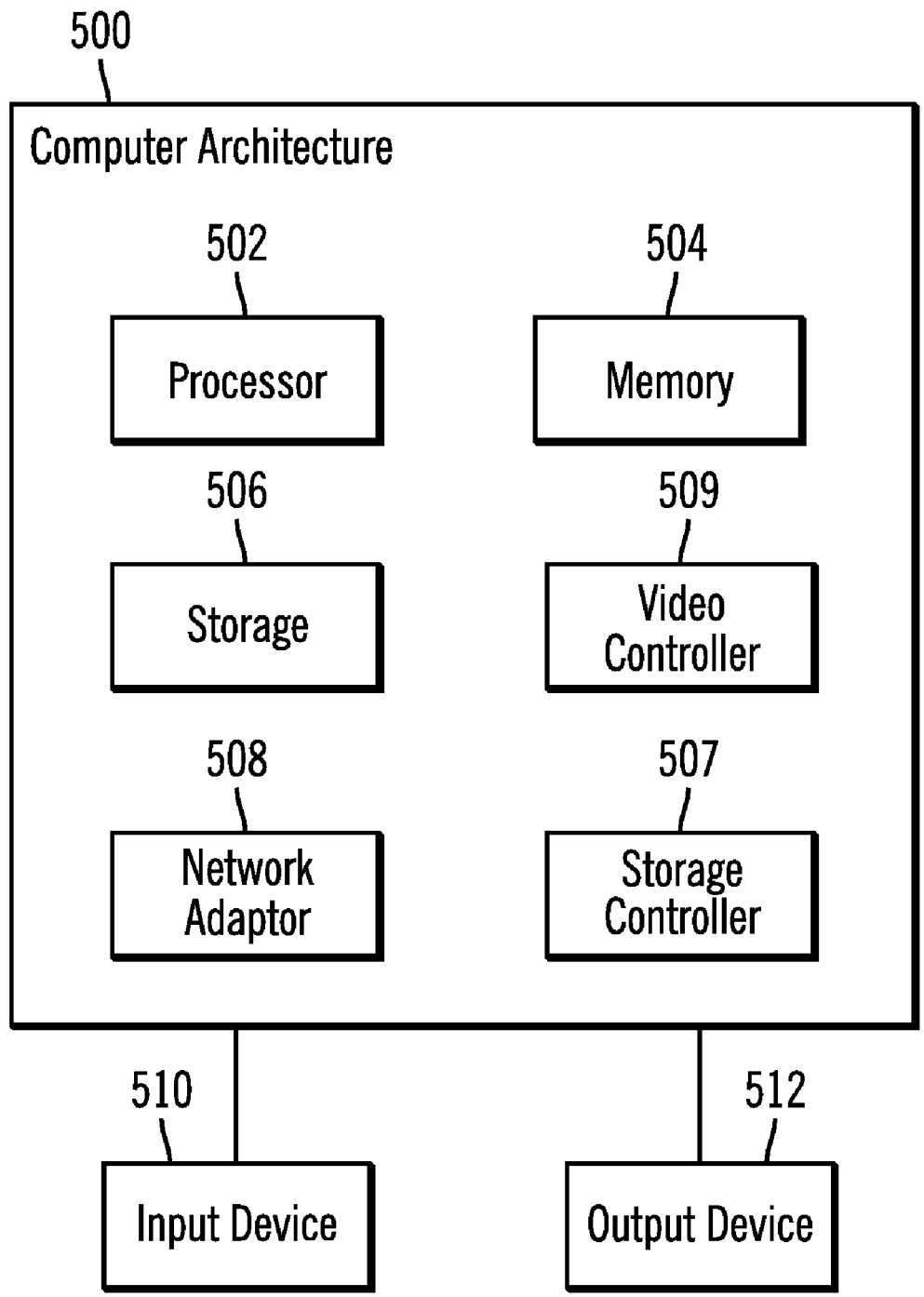
FIG. 10 illustrates an architecture that may be used with the described embodiments.

FIG. 10 illustrates one implementation of a computer architecture 500 of the network components, such as the hosts and storage devices shown in FIG. 3. The architecture 500 may include a processor 502 (e.g., a microprocessor), a memory 504 (e.g., a volatile memory device), and storage 506 (e.g., a non-volatile storage, such as magnetic disk drives, optical disk drives, a tape drive, etc.). The storage 506 may comprise an internal storage device or an attached or network accessible storage. Programs in the storage 506 are loaded into the memory 504 and executed by the processor 502 in a manner known in the art. A storage controller 507 can control the storage 506. The architecture further includes a network adapter 508 to enable communication with a network, such as an Ethernet, a Fibre Channel Arbitrated Loop, etc. Details on the Fibre Channel architecture are described in the technology specification "Fibre Channel Framing and Signaling Interface", document no. ISO/IEC AWI 14165-25.

Further, the architecture may, in certain embodiments, include a video controller 509 to render information on a display monitor, where the video controller 509 may be implemented on a video card or integrated on integrated circuit components mounted on the motherboard. As discussed, certain of the network devices may have multiple storage cards or controllers. An input device 510 is used to provide user input to the processor 502, and may include a keyboard, mouse, pen-stylus, microphone, touch sensitive display screen, or any other activation or input mechanism known in the art. An output device 512 is capable of rendering information transmitted from the processor 502, or other component, such as a display monitor, printer, storage, etc.

The storage controller 506 and the network adapter 508 may each be implemented on cards, such as a Peripheral Component Interconnect (PCI) card or some other I/O card, or on integrated circuit components mounted on the motherboard.

The foregoing description of various embodiments has been presented for the purposes of illustration and description. The above specification, examples and data provide a complete description of the manufacture and use of the composition. It is not intended to be exhaustive or to limit to the precise form disclosed. Many modifications and variations are possible in light of the above teaching.

What is claimed is:

1. A method of writing data, comprising:
   storing a first record in a disk storage unit wherein said first record includes an indication that a stripe of user data and parity data stored across a plurality of disk storage units potentially contains a parity inconsistency wherein each indication includes an identification of the stripe being indicated and wherein each identification includes a volume number and stripe number;
   writing user data and parity data in said stripe indicated by said record; and
   clearing said indication.

2. The method of claim 1 wherein said first record contains a plurality of indications for a plurality of stripes across said plurality of disk storage units, that said plurality of stripes each potentially contains a parity inconsistency.

3. The method of claim 2 wherein said plurality of disk storage units are arranged in a Redundant Array of Independent Disks type organization.

4. The method of claim 1 further comprising:
   receiving from a first plurality of write processes in a first accumulation period, a plurality of indications wherein each indication from a write process indicates that a destination stripe across said plurality of disk storage units, associated with the write process, potentially contains a parity inconsistency; and storing in response to said plurality of indications from said first plurality of write processes, in a second record a plurality of indications wherein each indication of said second record indicates that a destination stripe of said first plurality of write processes potentially contains a parity inconsistency.

5. The method of claim 4 further comprising receiving a flush instruction from a first write process of said first plurality of write processes and in response to said flush instruction, writing said second record to a disk storage unit.

6. The method of claim 5 further comprising sending, upon completion of said writing of said second record to a disk storage unit, a record write completion indication to each write process of said first plurality of write processes.

7. The method of claim 6 wherein a second write process of said first plurality of write processes writes user data and parity data in the destination stripe associated with the second write process, in response to the second write process receiving a record write completion indication, and sends a mark clean instruction for the destination stripe associated with the second write process.

8. The method of claim 7 further comprising receiving a mark clean instruction from the second write process of said first plurality of write processes and in response to said mark clean instruction, removing from said second record an indication that the destination stripe associated with the second write process potentially contains a parity inconsistency.

9. The method of claim 8 further comprising:
in response to said flush instruction, writing said second record to a flush record;
receiving a second flush instruction from a third write process of said first plurality of write processes; and
determining if the second record containing an indication that a destination stripe associated with said third write process potentially contains a parity inconsistency, has already been written to a disk storage unit.

10. The method of claim 8 further comprising:
receiving from a second plurality of write processes after said flush instruction, a second plurality of indications wherein each indication from a write process indicates that a destination stripe across said plurality of disk storage units, associated with the write process, potentially contains a parity inconsistency; and
storing in response to said plurality of indications from said second plurality of write processes, in said second record a second plurality of indications wherein each indication of said second plurality of indications of said second record indicates that a destination stripe of said second plurality of write processes potentially contains a parity inconsistency.

11. The method of claim 10 further comprising receiving a third flush instruction from a first write process of said second plurality of write processes and in response to said third flush instruction, writing said second record to a disk storage unit, wherein said clearing said indication includes writing said second record to a disk storage unit in which the indication that the destination stripe associated with the second write process potentially contains a parity inconsistency has been removed.

12. The method of claim 11 wherein the first record is stored with a first generation number in a first disk storage unit and the second record is stored with a second generation number in a disk storage unit different from the first disk storage unit.

13. An article of manufacture comprising a device having a storage medium, the storage medium comprising machine readable instructions stored thereon to:
store a first record in a disk storage unit wherein said first record includes an indication that a stripe of user data and parity data stored across a plurality of disk storage units potentially contains a parity inconsistency, wherein each indication includes an identification of the stripe being indicated and wherein each identification includes a volume number and stripe number;
write user data and parity data in said stripe indicated by said record; and
clear said indication.

14. The article of claim 13 wherein said first record contains a plurality of indications for a plurality of stripes across said plurality of disk storage units, that said plurality of stripes each potentially contains a parity inconsistency.

15. The article of claim 14 wherein said plurality of disk storage units are arranged in a Redundant Array of Independent Disks type organization.

16. The article of claim 13 wherein the storage medium further comprises machine readable instructions stored thereon to:
receive from a first plurality of write processes in a first accumulation period, a plurality of indications wherein each indication from a write process indicates that a destination stripe across said plurality of disk storage units, associated with the write process, potentially contains a parity inconsistency; and
store in response to said plurality of indications from said first plurality of write processes, in a second record a plurality of indications wherein each indication of said second record indicates that a destination stripe of said first plurality of write processes potentially contains a parity inconsistency.

17. The article of claim 16 wherein the storage medium further comprises machine readable instructions stored thereon to receive a flush instruction from a first write process of said first plurality of write processes and in response to said flush instruction, write said second record to a disk storage unit.

18. The article of claim 17 wherein the storage medium further comprises machine readable instructions stored thereon to send, upon completion of said writing of said second record to a disk storage unit, a record write completion indication to each write process of said first plurality of write processes.

19. The article of claim 18 wherein the storage medium further comprises machine readable instructions stored thereon for a second write process of said first plurality of write processes to write user data and parity data in the destination stripe associated with the second write process, in response to the second write process receiving a record write completion indication, and to send a mark clean instruction for the destination stripe associated with the second write process.

20. The article of claim 19 wherein the storage medium further comprises machine readable instructions stored thereon to receive a mark clean instruction from the second write process of said first plurality of write processes and in response to said mark clean instruction, remove from said second record an indication that the destination stripe associated with the second write process potentially contains a parity inconsistency.

21. The article of claim 20 wherein the storage medium further comprises machine readable instructions stored thereon to:
  in response to said flush instruction, write said second record to a flush record;
  receive a second flush instruction from a third write process of said first plurality of write processes; and
  determine if the second record containing an indication that a destination stripe associated with said third write process potentially contains a parity inconsistency, has already been written to a disk storage unit.

22. The article of claim 20 wherein the storage medium further comprises machine readable instructions stored thereon to:
  receive from a second plurality of write processes after said flush instruction, a second plurality of indications wherein each indication from a write process indicates that a destination stripe across said plurality of disk storage units, associated with the write process, potentially contains a parity inconsistency; and
  store in response to said plurality of indications from said second plurality of write processes, in said second record a second plurality of indications wherein each indication of said second plurality of indications of said second record indicates that a destination stripe of said second plurality of write processes potentially contains a parity inconsistency.

23. The article of claim 22 wherein the storage medium further comprises machine readable instructions stored thereon to receive a third flush instruction from a first write process of said second plurality of write processes and in response to said third flush instruction, write said second record to a disk storage unit, wherein said clearing said indication includes writing said second record to a disk storage unit in which the indication that the destination stripe associated with the second write process potentially contains a parity inconsistency has been removed.

24. The article of claim 23 wherein the first record is stored with a first generation number in a first disk storage unit and the second record is stored with a second generation number in a disk storage unit different from the first disk storage unit.

25. A system, comprising:
  at least one memory which includes an operating system and an application;
  a processor coupled to the memory;
  data storage having a plurality of disk storage units;
  a data storage controller for managing Input/Output (I/O) access to the data storage; and
  a device driver executable by the processor in the memory, wherein at least one of the application, operating system, and device driver is adapted to:
    store a first record in a disk storage unit wherein said first record includes an indication that a stripe of user data and parity data stored across said plurality of disk storage units potentially contains a parity inconsistency, wherein each indication includes an identification of the stripe being indicated and wherein each identification includes a volume number and stripe number;
    write user data and parity data in said stripe indicated by said record; and
    clear said indication.

26. The system of claim 25 wherein said first record contains a plurality of indications for a plurality of stripes across said plurality of disk storage units, that said plurality of stripes each potentially contains a parity inconsistency.

27. The system of claim 26 wherein said plurality of disk storage units are arranged in a Redundant Array of Independent Disks type organization.

28. The system of claim 25, wherein said at least one of the application, operating system, and device driver is further adapted to:
  receive from a first plurality of write processes in a first accumulation period, a plurality of indications wherein each indication from a write process indicates that a destination stripe across said plurality of disk storage units, associated with the write process, potentially contains a parity inconsistency; and
  store in response to said plurality of indications from said first plurality of write processes, in a second record a plurality of indications wherein each indication of said second record indicates that a destination stripe of said first plurality of write processes potentially contains a parity inconsistency.

29. The system of claim 28 wherein said at least one of the application, operating system, and device driver is further adapted to receive a flush instruction from a first write process of said first plurality of write processes and in response to said flush instruction, write said second record to a disk storage unit.

30. The system of claim 29 wherein said at least one of the application, operating system, and device driver is further adapted to send, upon completion of said writing of said second record to a disk storage unit, a record write completion indication to each write process of said first plurality of write processes.

31. The system of claim 30 wherein said at least one of the application, operating system, and device driver is further adapted for a second write process of said first plurality of write processes to write user data and parity data in the destination stripe associated with the second write process, in response to the second write process receiving a record write completion indication, and to send a mark clean instruction for the destination stripe associated with the second write process.

32. The system of claim 31 wherein said at least one of the application, operating system, and device driver is further adapted to receive a mark clean instruction from the second write process of said first plurality of write processes and in response to said mark clean instruction, remove from said second record an indication that the destination stripe associated with the second write process potentially contains a parity inconsistency.

33. The system of claim 32 wherein said at least one of the application, operating system, and device driver is further adapted to:
  in response to said flush instruction, write said second record to a flush record;
  receive a second flush instruction from a third write process of said first plurality of write processes; and
  determine if the second record containing an indication that a destination stripe associated with said third write process potentially contains a parity inconsistency, has already been written to a disk storage unit.

34. The system of claim 32 wherein said at least one of the application, operating system, and device driver is further adapted to:
  receive from a second plurality of write processes after said flush instruction, a second plurality of indications wherein each indication from a write process indicates that a destination stripe across said plurality of disk storage units, associated with the write process, potentially contains a parity inconsistency; and store in response to said plurality of indications from said second plurality of write processes, in said second record a second plurality of indications wherein each indication of said second plurality of indications of said second record indicates that a destination stripe of said second plurality of write processes potentially contains a parity inconsistency.

35. The system of claim 34 wherein said at least one of the application, operating system, and device driver is further adapted to receive a third flush instruction from a first write process of said second plurality of write processes and in response to said third flush instruction, write said second record to a disk storage unit, wherein said clearing said indication includes writing said second record to a disk storage unit in which the indication that the destination stripe associated with the second write process potentially contains a parity inconsistency has been removed.

36. The system of claim 35 wherein the first record is stored with a first generation number in a first disk storage unit and the second record is stored with a second generation number in a disk storage unit different from the first disk storage unit.

* * * * *